Oct. 1, 1935.   H. N. ENSIGN ET AL   2,016,083
MOTION PICTURE FILM PROPELLING MEANS
Filed July 17, 1933   2 Sheets-Sheet 1
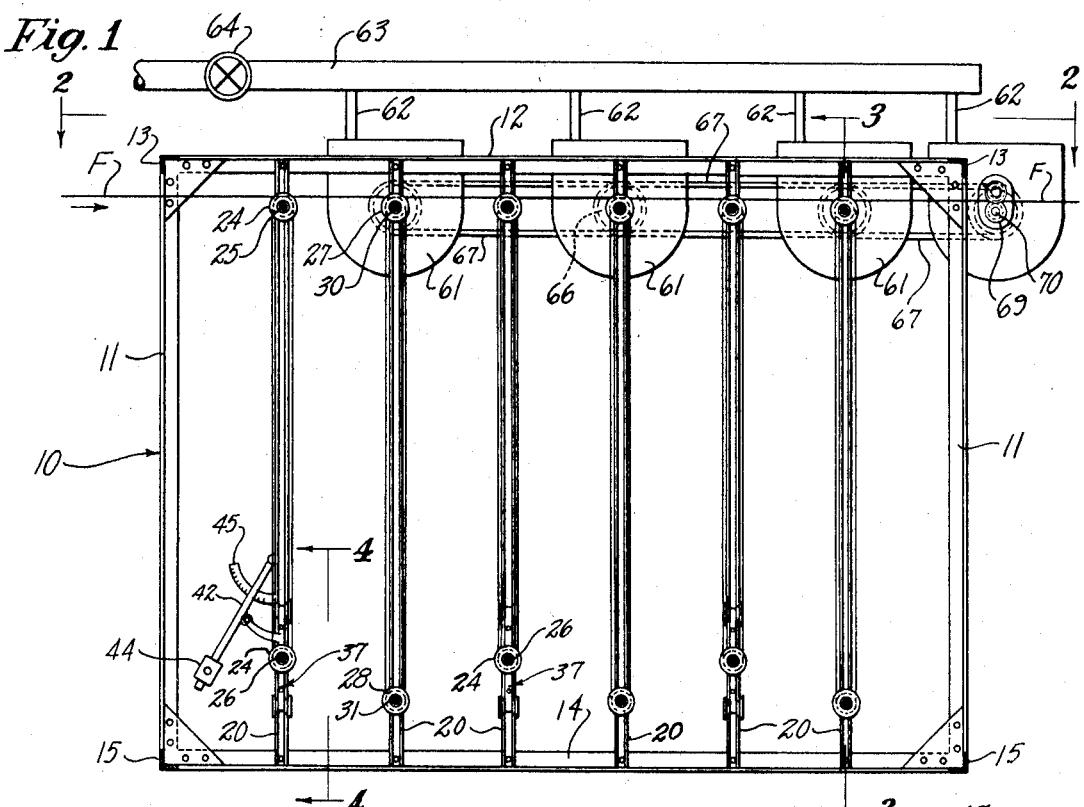
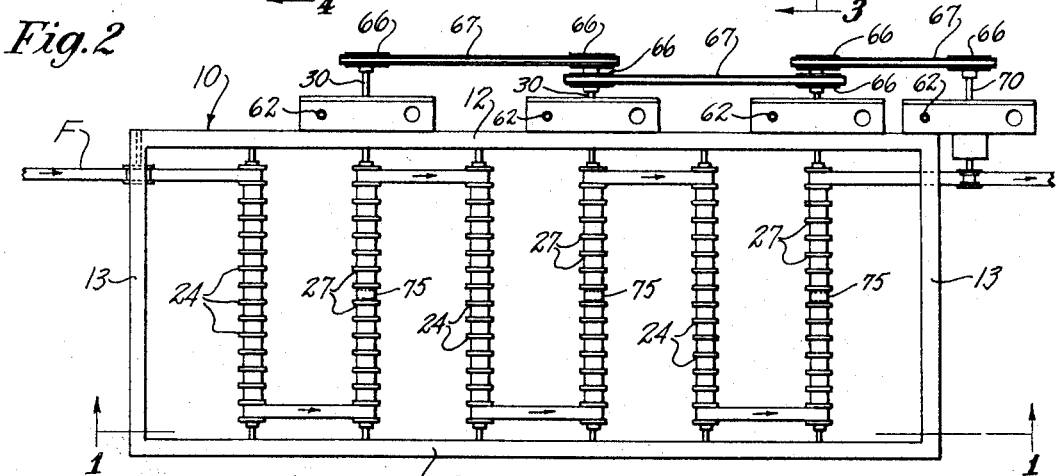
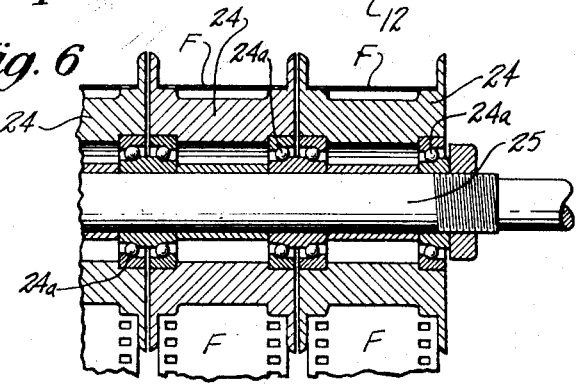
*Inventors*
Harris N. Ensign,
Harry A. Hanson.
*Attorney.*

Oct. 1, 1935.                H. N. ENSIGN ET AL                2,016,083
                      MOTION PICTURE FILM PROPELLING MEANS
                      Filed July 17, 1933            2 Sheets-Sheet 2
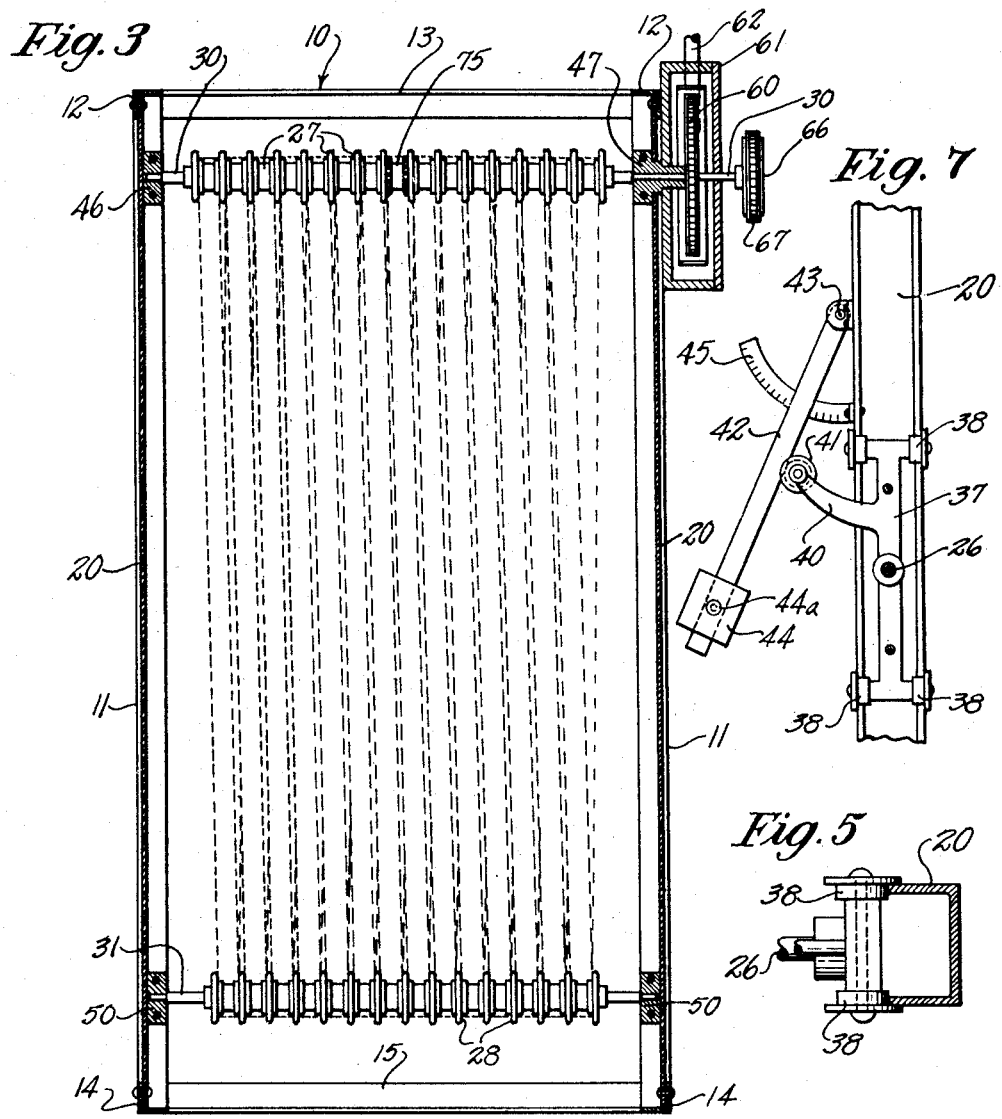
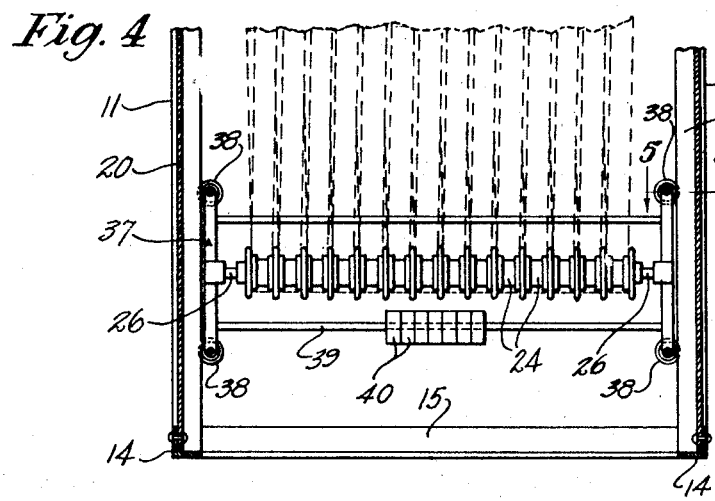
Inventors
Harris N. Ensign,
Harry A. Hanson.
Attorney.

Patented Oct. 1, 1935

2,016,083

UNITED STATES PATENT OFFICE 2,016,083

MOTION PICTURE FILM PROPELLING MEANS

Harris N. Ensign, Los Angeles, and Harry A. Hanson, West Los Angeles, Calif., assignors to Paramount Productions, Inc., Los Angeles, Calif., a corporation of Delaware Application July 17, 1933, Serial No. 680,768

15 Claims. (Cl. 271—2.3)

This invention relates generally to means for propelling motion picture film through liquid baths and driers.

In developing motion picture film, the film strip ordinarily is continuously run in succession through the developing solution, the fixing bath, the water wash and finally the drier. The continuously moving film strip is thus in part undergoing wet treatment and in part being dried, and since film expands when wet and contracts during drying, both elongation and shrinkage must be simultaneously contended with in the same film strip. This condition gives rise to considerable difficulty in moving the film strip through both the "wet" and "dry" ends of the system, since the expanding wet film tends to become slack and slip on the drive rollers (which ordinarily are without sprocket teeth), while the contracting film in the drier is simultaneously tending to become unduly tightened on the drive rollers. These difficulties are so well appreciated in the art as to require no further elaboration here.

It is accordingly an object of the present invention to provide an improved and simplified means for propelling film strips through liquid baths and driers, which will overcome the various difficulties referred to above.

In accordance with the present preferred form of our invention the film is wound over successive sets of smooth film rollers, and each of such sets is provided with one driven film sprocket having film engaging teeth. Between successive sets of such rollers the film passes over elevators having yielding means placing the film under a certain tension. In one form or aspect of the invention this means is utilized to place only sufficient tension in the film to keep it properly taut, so as to remove slack that may come into the film, in the case of a wet bath, or to yield with film shrinkage, in the case of a drier. In another form or aspect of the invention this means is designed to place sufficient tension in the film under all conditions of film elongation or film shrinkage, to give a frictional driving engagement between the smooth film rollers and the film strip. For instance, such tensioning means may comprise floating film rollers hanging in loops formed in the film, and the amount of tension placed on the film may be controlled by weighting said rollers. In the case where this means is adjusted to tense the film sufficiently to give a driving engagement between the film and the smooth rollers of the successive roller sets mentioned above, said rollers are driven together with the toothed film sprocket to advance the film; but where it is not desired to drive the film by means of the smooth rollers the tension placed in the film need only be sufficient to take up any slack therein due to elongation, and it is not necessary that the smooth rollers be driven since in this case the toothed film sprockets are relied upon to advance the film. In either case the toothed film sprockets, in addition to their film driving function, serve to divide the system into sections within each one of which the quantity of film, or "number of sprocket holes", is maintained fixed. A progressive slippage of the film strip throughout the machine is thus positively prevented.

With this preliminary discussion in mind, the various features and aspects of the invention will be best understood by now referring to the following detailed description of a present preferred embodiment thereof, reference for this purpose being had to the accompanying drawings, in which:

Fig. 1 is a vertical longitudinal section of the machine taken on line 1—1 of Fig. 2;

Fig. 2 is a plan view of the machine being taken on line 2—2 of Fig. 1;

Fig. 3 is a vertical transverse section take on line 3—3 of Fig. 1;

Fig. 4 is a vertical detail section taken on line 4—4 of Fig. 1;

Fig. 5 is a detail section taken on line 5—5 of Fig. 4;

Fig. 6 is a transverse section through a typical roller shaft showing the independent mounting of the film rollers thereon; and Fig. 7 is an enlarged detail of a control device.

For the purpose of simplicity we show in the drawings merely the film rollers and supporting and driving means therefor, liquid tanks or drying chambers within which the aforementioned may be used, in the case of wet or dry machines, respectively, being omitted since they may be of any usual or suitable construction. Moreover, it is to be understood that the specific embodiment herein described in detail is merely illustrative of one specific manner in which the broad invention may be carried into effect, from which description those skilled in the art will receive a broad understanding of our invention.

In the drawings numeral 10 designates generally a frame work upon which the rollers and driving devices may be mounted, the frame work here shown being made up of angle irons and comprising corner uprights 11, upper longitudinal members 12 and cross members 13, and lower longitudinal members 14 and cross members 15. Spaced longitudinally of frame 10 are pairs of vertical, film-roller shaft supporting members 20, here shown as of channel cross section (see Fig. 5), and between each pair of which are mounted the upper and lower film roller shafts. In the present instance, alternate pairs of upper and lower roller shafts, here the first, third, fifth, and so on, have no film driving function and comprise what are known in the art as elevators, while the remaining pairs, here the second, fourth, sixth and so on, have a film driving function and may be referred to as drivers.

The film strip F, entering the machine from the left-hand end as viewed in Fig. 1, passes first over an end upper roller 24, and is then wound spirally over the staggered upper and lower rollers on shafts 25 and 26 to the other ends of said shafts, then passes forwardly to the end roller of a series of rollers 27 on the upper shaft 30 of the first driver, and is spiralled around the staggered rollers 27 and 28 of the upper and lower shafts 30 and 31, respectively, of the driver. From the last upper roller of the driver the film is taken forwardly to a second elevator, and from that elevator forwardly to a second driver, and so on to the outgoing end of the machine.

Rollers 24 on both shafts 25 and 26 preferably are mounted to rotate freely and individually on their shafts and are provided with roller bearings as indicated at 24a in Fig. 6. The upper roller shaft 25 of each elevator is suitably mounted at its two ends on channel members 20. The lower roller shaft 26 of each elevator is mounted at its two ends on a vertical movable carriage 37, said carriage 37 having rollers 38 adapted to run on the vertical flanges of channel members 20 as tracks (see Fig. 5). For the purpose of adjusting the weight of the carriage, the carriage is provided with a horizontal cross bar 39 adapted to carry a plurality of removable weights 40, the proper weight of the carriage being adjusted by removing or adding said weights. Thus in the preferred form described the lower rollers of the elevators float vertically and are supported by the film loops, the tension in the film strip depending upon the weight of the carriage as adjusted by means of weights 40.

Preferably, there is provided a yielding means for increasingly resisting elevation of the floating roller carriage of the first elevator as said carriage is elevated. Although various expedients may be employed for this purpose, roller carriage 37 of the first elevator is shown in Figs. 1 and 7 provided with an arm 40 carrying a roller 41 that supports an inclined weight arm 42 pivotally mounted at its upper end as at 43, on channel member 20. The lower end of arm 42 slidably carries a weight 44 having a set screw 44a for setting the weight at various positions on the arm. It will be obvious that weight arm 42 exerts a downward force on arm 40 and the film roller carriage 37, and that this downward force increases as the carriage rises and swings the weight arm outwardly. A suitably calibrated scale 45 is provided for reading the inclination of arm 42, the scale reading being proportional to the downward force exerted by the weight arm on the carriage. By virtue of this provision the downward force on the film roller carriage increases as the film rollers rise with shortening of the film loops, the tendency of the device thus being to yieldingly but increasingly resist shortening of the film loops. The calibrated scale 45 indicates when the film loops are the proper length and the proper weight accordingly is on the film rollers, to give desired tension in the film strip. This condition is obviously controllable either by adjusting the speed of the film drive rollers to correspond with the speed at which the film is supplied to the machine, or by adjusting the rate of film supply to the machine, and the reading of scale 45 therefore indicates the correct adjustment for proper film tension.

The upper shaft 30 of each driver, in the illustrated embodiment, is mounted at one end in a bearing 46 mounted on channel member 20, and its other end extends outwardly through a bearing 47 on the opposite channel 20 and has outside of said channel member a suitable drive means, as described more fully hereinafter. The film rollers 27 on upper driver shafts 30 may be fast on their shafts, especially where it is desired that the smooth rollers on the driver shaft shall partake in the driving of the film; while in cases where dependence is placed entirely upon the sprockets for moving the film it is not necessary that the rollers be fast on the shaft, and if it is desired to avoid film drive by the smooth rollers the rollers may of course be mounted rotatable on the shaft. In the form illustrated, however, the rollers are fast on the shaft, and are preferably, though not necessarily, formed integral with one another.

The lower shaft 31 of each driver is mounted at its two ends in supports 50 affixed to channel members 20, and the film rollers 28 on lower shafts 31 are relatively rotatable on the shafts and independent of one another, after the manner shown in Fig. 6.

While various drive means for the upper driver shaft may be employed to advantage, we prefer to employ air driven turbine wheels 60 mounted on the shaft ends just outside of bearings 47 (see Fig. 3). Casings 61 are shown enclosing the wheels. Air under suitable pressure is supplied to the turbine wheels through feed pipes 62 extending within turbine casings 61, said feeders being supplied from a header 63 controlled by a valve 64.

To insure equal drive speed throughout the machine, upper driver shafts 30 are preferably drivingly interconnected. For instance, the extremities of the several shafts may have sprocket wheels 66 connected together by chains 67.

From the last driver the film strip is removed from the machine by means of a sprocket 69, which is on the end of a shaft 70 also driven by a turbine wheel and also drivingly interconnected by sprocket and chain with the several driver shafts of the machine.

In the preferred embodiment described, the film rollers on the upper and lower shafts of the elevators and on the lower shafts of the drivers are all independent and freely rotatable on their respective shafts, while the rollers on the upper or driven shafts of the drivers are fixed on their shafts, although in certain cases the latter rollers need not be fixed on their shafts, and the rollers as so far described are all smooth surface rollers without sprocket teeth. A toothed roller or sprocket 75 is then rigidly mounted on the driven shaft of each driver. This sprocket 75 preferably, though not necessarily, is located substantially at the center of the upper driver shaft 30, as shown. As a result of the presence of these sprockets the quantity of film, or "number of sprocket holes", between the sprockets 75 of successive drivers is maintained constant, the sprockets positively precluding a general movement of slack in either direction through the machine.

The operation of the machine is then as follows: The film strip F will be understood to be continuously supplied from a feeding device which feeds it forwardly at substantially constant speed; for instance, in case the instant machine is used as a drier, the film strip will be constantly fed into the machine from the usual take-out means at the outgoing end of the wet machine. Or, if the present machine is embodied as a developer, the film strip may be supplied from any usual feeding device. In any case, the film strip may be considered as fed at substantially a constant rate to the ingoing end of the present machine. The incoming film strip is looped first over an elevator, then over a driver, then over a second elevator, and so on, to the final driver, and is finally taken out by the driven sprocket 69. The machine may be operated in either of two manners, or a combination of the two, depending upon the tension placed in the film strip by the weighting of the floating roller carriages of the elevators. Thus in case it is desired that only the toothed film sprockets shall drive the film, the tension in the film may be made only sufficient to take up the slack therein and not sufficient to give a frictional driving engagement with the surfaces of the smooth film rollers, and in this case it is of course largely immaterial whether or not the smooth rollers are loose or fixed on the driver shafts. But if it is desired that the smooth film sprockets shall partake in the drive of the film, or shall constitute the main driving means, then the elevator carriages are weighted until the tension in the film strip is sufficient to give the necessary frictional driving engagement between the smooth rollers and the film. In the first case the film is driven entirely by the sprockets, and in the last case either entirely or else partly by the smooth rollers.

The proper operative condition of the machine is not substantially altered by elongation of the film strip within the machine in the case of a wet machine, or with contraction, in the case of a drier, since these changes in length are taken up by vertical movement of the lower elevator rollers, without changing the tension on the film strip, and without the total quantity of film— the "number of sprocket holes"—within the machine being affected.

The air supply to the drivingly inter-connected turbine wheels is preferably so regulated that the film drive rollers or sprockets are slightly over-driven, and are held back by the film strip. The position of the film tension controlled weight arm 42, as read by scale 45, indicates when the machine is driven with proper power to take the film strip properly at just the speed at which it is supplied thereto. For instance, if the film is driven at too great a speed, the film loops in the first elevator will shorten, an arm 42 will rise accordingly, thereby indicating that the air supply to the turbines should be reduced. And if the arm lowers, indicating insufficient drive power, the air supply should be increased. Arm 42 is thus an indicator of proper power on the drive turbines, and the arm position for proper operative conditions is marked on scale 45 whereat the film loops in the first elevator stabilize at constant length with the drive rollers or sprockets slightly over-powered but held back by the film strip to the speed at which the film is fed to the machine.

It will be understood that the drawings and description are to be considered merely as illustrative of rather than restrictive on the broader claims appended hereto, for various changes in design, structure and arrangement may be made without departing from the spirit and scope of said claims.

We claim:

1. In film propelling apparatus, the combination of two sets of smooth film rollers over which a film strip may be successfully threaded, each such set comprising a drive shaft and a second shaft, a series of smooth film rollers rigidly mounted on said drive shaft and a series of smooth film rollers on said second shaft, a toothed film sprocket on each drive shaft, interconnected drive means for said drive shafts, and an elevator for the film strip between the outgoing and incoming ends of said sets of film rollers, said elevator comprising an upper shaft and smooth film rollers independently rotatable thereon, and a lower vertically floating shaft and smooth film rollers independently rotatable thereon.

2. In film propelling apparatus, the combination of a plurality of successive sets of smooth film rollers over which a film strip may be successively threaded, each such set comprising a drive shaft and a second shaft, a series of smooth film rollers rigidly mounted on said drive shaft and a series of smooth rollers on said second shaft, a toothed film roller on each drive shaft, interconnected drive means for the drive shafts, and elevators for the film strip between the outgoing and incoming ends of said successive sets of film rollers, each of said elevators comprising an upper shaft and smooth film rollers independently rotatable thereon, and a lower vertically floating shaft and smooth film rollers independently rotatable thereon.

3. In film propelling apparatus, the combination of a plurality of successive sets of smooth film rollers over which a film strip may be successively threaded, each such set comprising a drive shaft and a second shaft, a series of smooth film rollers mounted on said drive shaft and a series of smooth rollers on said second shaft, a toothed film roller rigidly mounted on each drive shaft, means for driving the drive shafts in unison, and elevators for the film strip between the outgoing and incoming ends of said successive sets of film rollers, each of said elevators comprising an upper shaft and film rollers mounted thereon and a lower vertically floating shaft and film rollers independently rotatable thereon.

4. In film propelling apparatus, the combination of a plurality of successive sets of smooth film rollers over which a film strip may be successively threaded, each such set comprising a drive shaft and a second shaft, a series of smooth film roller mounted on said drive shaft and a series of smooth rollers on each drive shaft, means for driving the drive shafts in unison, and elevators for the film strip between the outgoing and incoming ends of said successive sets of film rollers, each of said elevators comprising two shafts relatively movable one toward and from the other, film rollers mounted on said shafts over which the film strip may be passed, and means yieldingly acting to move said shafts apart to take up slack in the film strip.

5. In film propelling apparatus, the combination of a film elevator comprising upper film rollers and vertically floating lower film rollers around which a film strip may be convoluted, a plurality of film drivers each comprising a set of film rollers, and said drivers arranged to take the film strip in succession, the first driver arranged to take the film strip from the outgoing end of said elevator, an elevator comprising upper film rollers and vertically floating lower film rollers between the outgoing and incoming ends of each pair of successive drivers, and means for driving certain rollers of the several drivers in unison.

6. In film propelling apparatus, the combination of a film elevator comprising upper film rollers and vertically floating lower film rollers around which a film strip may be convoluted, a plurality of film drivers each comprising a set of smooth film rollers and a toothed sprocket, and said drivers arranged to take the film strip in succession, the first driver arranged to take the film strip from the outgoing end of said elevator, an elevator comprising upper film rollers and vertically floating lower film rollers between the outgoing and incoming ends of each pair of successive drivers, and means for driving the toothed sprockets of said drivers in unison.

7. In film propelling apparatus, the combination of a film elevator comprising upper film rollers and vertically floating lower film rollers around which a film strip may be convoluted, means placing an increasing downward force on said floating rollers as they are elevated by shortening of the film convolutions, a plurality of film drivers each comprising a set of film rollers, and said drivers arranged to take the film strip in succession, the first driver arranged to take the film strip from the outgoing end of said elevator, an elevator comprising upper film rollers and vertically floating lower film rollers between the outgoing and incoming ends of each pair of successive drivers, and means for driving certain rollers of the several drivers in unison.

8. In film propelling apparatus, the combination of a film elevator comprising upper film rollers and vertically floating lower film rollers around which a film strip may be convoluted, means placing an increasing downward force on said floating rollers as they are elevated by shortening of the film convolutions, a plurality of film drivers each comprising a set of smooth film rollers and a toothed sprocket, and said drivers arranged to take the film strip in succession, the first driver arranged to take the film strip from the outgoing end of said elevator, an elevator comprising upper film rollers and vertically floating lower film rollers between the outgoing and incoming ends of each pair of successive drivers, and means for driving the toothed sprockets of said drivers in unison.

9. In film propelling apparatus, the combination of two sets of smooth film rollers over which a film strip may be successfully threaded, each such set comprising a drive shaft and a second shaft, a series of smooth film rollers mounted on said drive shaft and a series of smooth film rollers on said second shaft, a toothed film sprocket on each drive shaft, interconnected drive means for said drive shafts, and an elevator for the film strip between the outgoing and incoming ends of said sets of film rollers, said elevator comprising an upper shaft and smooth film rollers independently rotatable thereon, and a lower vertically floating shaft and smooth film rollers independently rotatable thereon.

10. In film propelling apparatus, the combination of a plurality of sets of film rollers, each such set comprising a series of smooth rollers over which a film strip may be passed in succession and including a driven toothed sprocket over which the film also passes, and film tensing means acting on the film at a point between the last roller of one such set and the first roller of the next such set.

11. In film propelling apparatus, the combination of a plurality of sets of film rollers, each such set comprising a series of smooth rollers over which a film strip may be passed in succession and including a toothed film sprocket, means for driving certain of the smooth rollers and said toothed sprocket, and film tensing means acting on the film at a point between the last roller of one such set and the first roller of the next such set.

12. In film propelling apparatus, the combination of a plurality of sets of film rollers, each such set comprising a series of smooth rollers over which a film strip may be passed in succession and including a driven toothed sprocket over which the film also passes, and film tensing means acting on the film at a point between the last roller of one such set and the first roller of the next such set, said means comprising an elevator consisting of upper film rollers and vertically floating lower film rollers.

13. In film propelling apparatus, the combination of a plurality of sets of film rollers, each such set comprising a series of smooth rollers over which a film strip may be passed in succession and including a driven toothed sprocket over which the film also passes, an elevator for the film strip between the last roller of one such set and the first roller of the next such set, each such elevator comprising a set of film rollers over which the film strip is threaded, and means for taking up slack in the film strip on said elevator.

14. In film developing apparatus, the combination of a plurality of film drivers each comprising a set of film rollers, and said drivers arranged to take the film strip in succession, an elevator comprising upper film rollers and vertically floating lower film rollers between the outgoing and incoming ends of each pair of successive drivers, and means for driving certain rollers of the several drivers in unison.

15. In film developing apparatus, the combination of a plurality of film drivers each comprising a set of smooth film rollers and a toothed film sprocket, and said drivers arranged to take the film strip in succession, an elevator comprising upper film rollers and vertically floating lower film rollers between the outgoing and incoming ends of each pair of successive drivers, and means for driving the toothed sprockets of said drivers in unison.

HARRIS N. ENSIGN.
HARRY A. HANSON.